July 16, 1963  J. BENEDICT  3,097,675
BAND LUBRICATOR FOR CUTOFF MACHINES AND THE LIKE
Filed April 19, 1961  2 Sheets-Sheet 1

Joseph Benedict

July 16, 1963  J. BENEDICT  3,097,675
BAND LUBRICATOR FOR CUTOFF MACHINES AND THE LIKE
Filed April 19, 1961  2 Sheets-Sheet 2
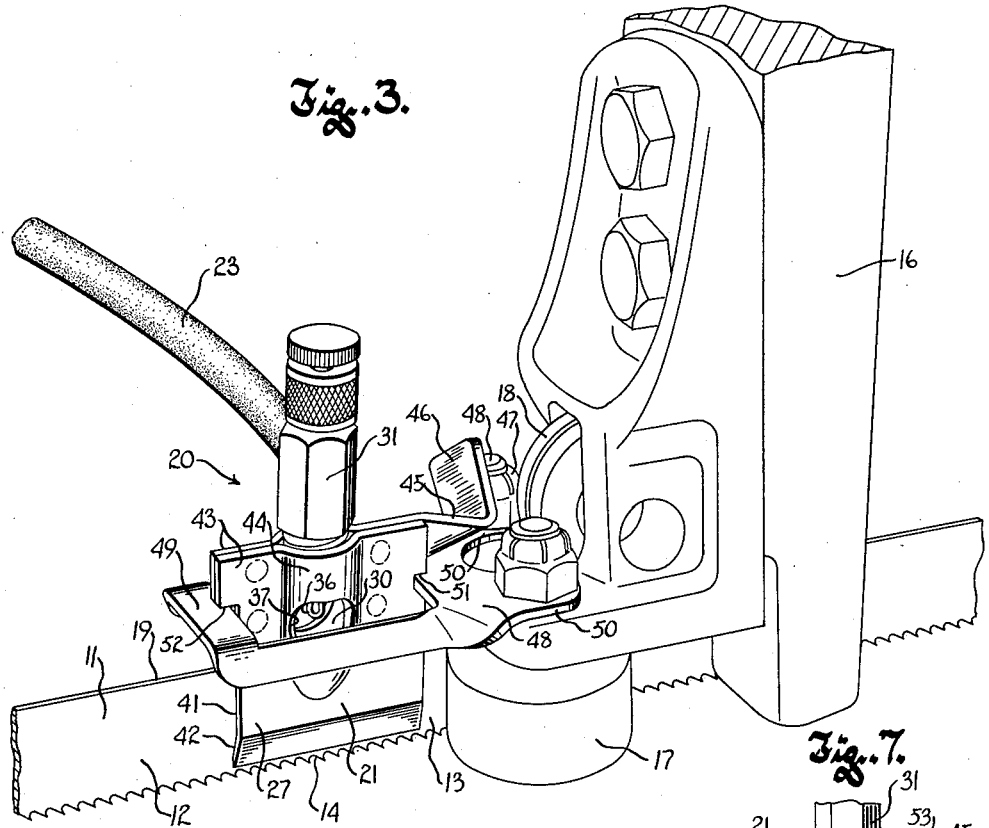
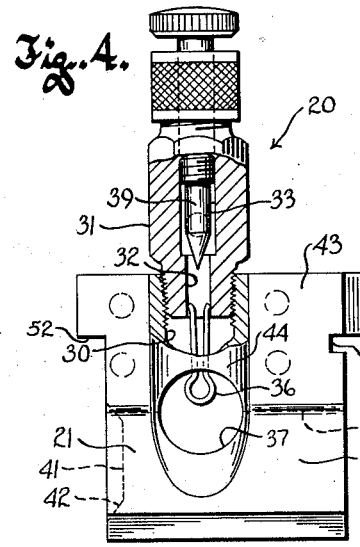
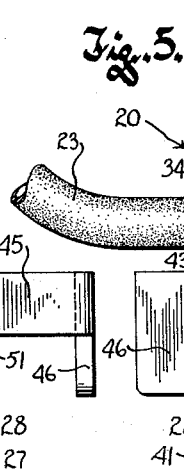
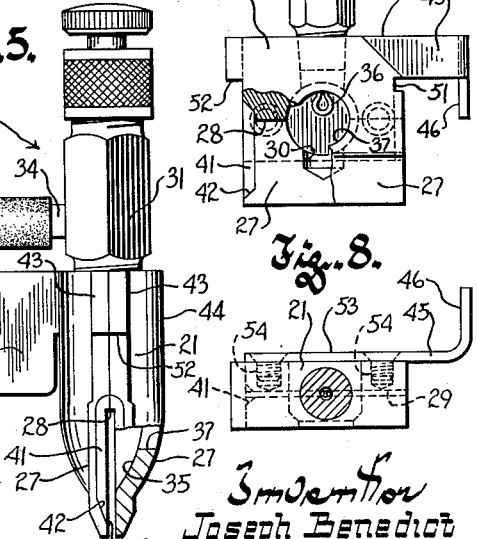
Inventor
Joseph Benedict

United States Patent Office 3,097,675
Patented July 16, 1963

3,097,675
BAND LUBRICATOR FOR CUTOFF MACHINES AND THE LIKE
Joseph Benedict, Downers Grove, Ill., assignor to The DoAll Company, Des Plaines, Ill., a corporation of Illinois
Filed Apr. 19, 1961, Ser. No. 104,072
3 Claims. (Cl. 143—158)

This invention relates to means for applying liquid lubricant to an endless saw band in a band machine, and refers more particularly to an applicator by which a film of oil or the like can be applied to a saw band in a cutoff saw, and which applicator is adapted for installation on various makes and models of cutoff saws without requiring modification of a machine on which it is installed.

In a cutoff saw an endless flexible saw band is trained around a pair of band wheels that are mounted on a frame or the like which carries the band wheels and saw band for up and down motion relative to a work supporting table on the base of the machine. The saw band has a straight cutting stretch, between the band wheels, which is normally substantially horizontal and which extends through a cutting zone of the machine adjacent to the work supporting table. Saw guides at opposite sides of the cutting zone engage the band in said stretch thereof to hold it with its side faces upright and its teeth lowermost, so that as the frame is moved downwardly the saw band can cut straight down through work pieces supported on the table.

Since high cutting speed is an important feature of a band cutoff machine, it is desirable that the saw band be lubricated at the cutting zone of the machine to minimize its friction with work pieces being cut. In the more expensive cutoff machines means are provided for flooding cutting liquid onto the saw band in the working zone and for collecting, filtering and recirculating the used cutting liquid. In the less expensive machines the advantages that can be gained from the use of cutting liquid are sacrificed in order to achieve a lower selling price, and it is for such machines that the device of this invention is intended.

The present invention thus has for its general object the provision of an inexpensive device for lubricating the saw band in a cutoff machine or the like that is not provided with a feed for cutting liquid, and by which device oil is brought to the saw band at a constant but controllable rate and is evenly distributed over the surface of the band as it enters the cutting zone.

More specifically, it is an object of this invention to provide an oil applicator by which a film of liquid lubricant can be constantly and automatically applied to the saw band of a band cutoff machine of the character described, to thus compensate to some extent for the absence of cutting liquid feeding means in such a machine, which applicator is not only very inexpensive, but is also very easy to install on virtually any make or model of band cutoff machine without requiring modification or alteration of the machine.

Another specific object of this invention is to provide a versatile automatic applicator for liquid lubricant having a shoe which rests on the saw band of a cutoff machine in such a manner as to be supported by the band itself, but which is held against movement with the band, in a location directly adjacent to the cutting zone of the machine, by very simple means capable of being adjusted to fit substantially any machine without the necessity for making any structural change in the machine itself.

Cutoff machines which do not have provision for recirculating cutting liquid are naturally not provided with means for collecting any excess oil or cutting liquid that may drip off of the band, and consequently it is important that oil should not be applied to the band of such a machine at an excessive rate, since this would lead to a very messy condition. Obviously, however, oil should be applied to the band at a rate sufficient to afford adequate lubrication. With these requirements in mind, it is another object of this invention to provide a simple and inexpensive liquid lubricant applicator of the character described which can be readily adjusted for greater or lesser rates of lubricant flow to the saw band, and having provision for readily determining by inspection the rate at which lubricant is applied to the saw band to thus permit the rate at which oil is applied to the band to be regulated in correspondence with the rate at which it is used and thereby avoid dripping of oil off of the band.

A further object of this invention resides in the provision of a liquid lubricant applicator of the character described having means for substantially evenly distributing over the side surfaces, back edge and gullets of a saw band the liquid lubricant which the applicator delivers to the band, to insure that all portions of the band will be coated with a film of lubricant as the band enters the cutting zone of the machine.

It is also a specific object of this invention to provide a liquid lubricant applicator of the character described which employs as its source of lubricant a conventional container that can very well be the container in which the lubricant is purchased, and which allows such container to be mounted at substantially any desired location on the machine, above the cutting zone thereof, so as to assure maximum convenience and versatility in the installation of the applicator of this invention to a band cutoff machine.

It is also an object of this invention to provide an automatic liquid lubricant applicator of the character described which is not only versatile, in that it can be readily installed on any machine that would be benefited by such a device, and can be adjusted to feed lubricant to the saw band at substantially any required rate, but which is also very inexpensive, so that the advantages of automatic saw band lubrication can be obtained without the necessity for incurring more than merely nominal expense for the device itself and for its installation on a cutoff machine.

With the above and other objects in view which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawings illustrates two complete examples of the physical embodiments of the invention constructed according to the best modes so far devised for the practical application of the principles thereof, and in which:

FIGURE 3 is a view similar to FIGURE 2 but showing the liquid lubricant applicator of this invention installed on another type of band cutoff machine;

FIGURE 4 is a side elevational view of the distributor or shoe of the applicator of this invention, a portion thereof being cut away and shown in section;

FIGURE 5 is an end elevational view of the applicator distributor or shoe shown in FIGURE 4, also with a portion thereof broken away and in section;

FIGURE 7 is a side elevational view of a modified form of the applicator shoe of this invention, a portion thereof being cut away and shown in section; and FIGURE 8 is a top view of the modified form of shoe shown in FIGURE 7.

Figure 1:
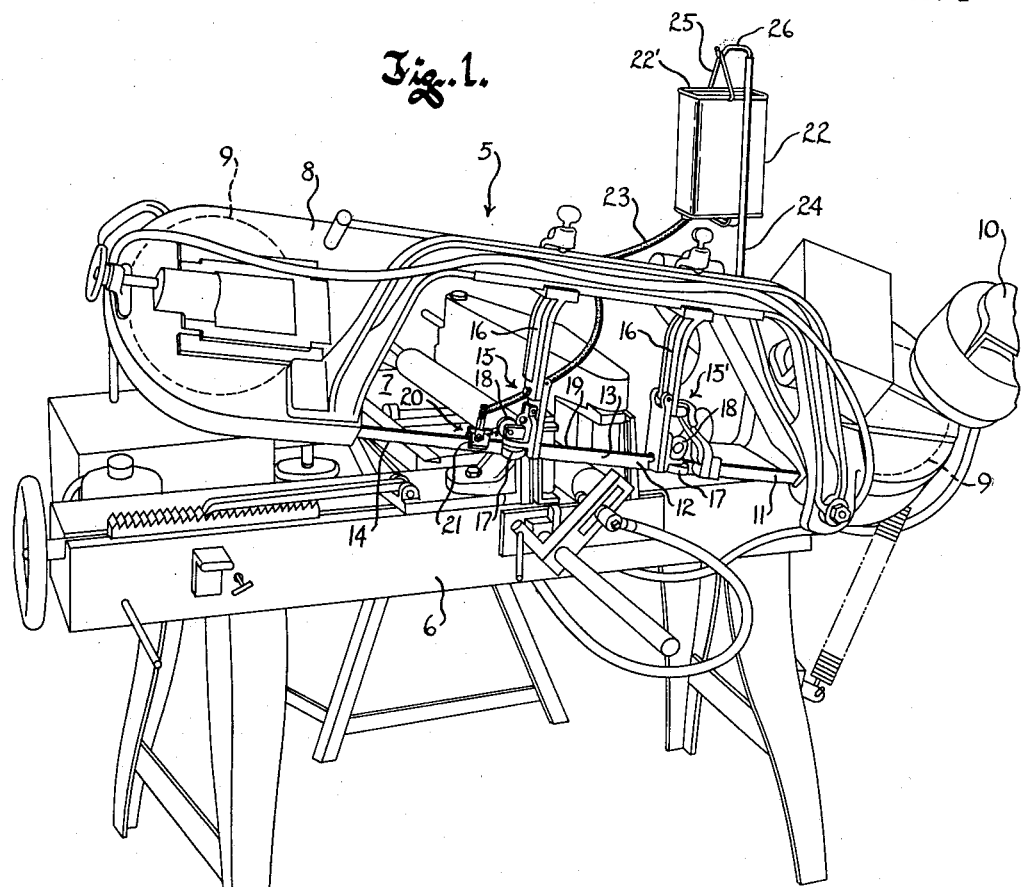
FIGURE 1 is a perspective view of a band cutoff machine having a liquid lubricant applicator of this invention installed thereon.

Referring now more particularly to the accompanying drawings, the numeral 5 designates generally a band cutoff machine having a base 6 upon which are mounted a work supporting table 7 and a frame 8 that is movable up and down relative to the base. The frame 8 carries a pair of horizontally spaced apart band wheels 9, one of which is rotatably driven by an electric motor 10 to thus impart orbital motion to an endless saw band 11 trained around the wheels. The axes of the two band wheels 9, which are of course parallel to one another, are inclined to the horizontal so that the straight, substantially horizontal stretches of saw band between the wheels are spaced apart horizontally as well as vertically.

The lower straight stretch 12 of the saw band, which is adjacent to the work supporting table 7 and which comprises the cutting stretch of the band, extends through the cutting zone of the machine with its side surfaces 13 substantially upright and its teeth 14 lowermost. To give the cutting stretch 12 of the band the disposition just described, it is held partially twisted by means of a pair of guides 15 and 15' which engage the saw band at locations spaced lengthwise along its cutting stretch and which define the cutting zone of the machine, located between them. Each of the guides comprises a support or arm 16 which is secured to the frame 8 to be carried thereby for up and down movement therewith and which is adjustable relative to the frame in directions lengthwise of the cutting stretch of the band. Each guide arm 16 carries a pair of freely rotatable guide rollers 17 that engage the opposite side surfaces of the band, and a freely rotatable back-up roller 18 that engages the back edge 19 of the band.

In the case of the machine shown in FIGURE 1, the saw band moves from left to right through its cutting stretch 12. Just before it passes through the guide rollers 17 of the left hand guide assembly 15, a film of liquid lubricant is applied to the band by means of the applicator of this invention, designated generally by 20, so that the band is adequately lubricated as it cuts through work on the table 7.

The applicator comprises in general a container 22 that serves as a source of oil, a somewhat elongated distributor or shoe 21, having a substantially U-shaped cross section along its entire length, which straddles the saw band adjacent to the left hand guide 15 and which serves to apply oil to the saw band and to spread it evenly thereover, and a flexible tube or duct 23 that communicates the container with the shoe.

The container 22, which may be the ordinary screw-top can in which the oil is purchased, can be carried by a standard 24 fixed to the base 6 of the machine. A tong-like bail 25, clampingly gripping opposite sides of the container and engaging the rolled rim 22' around its bottom, can be used to suspend the container upside down from a laterally projecting hook-like arm 26 on the standard. A suitable fitting (not shown), adapted to be received on the screw-top opening of the container, provides a connection between the container and the flexible duct 23.

The distributor or shoe 21 can be made of stampings, as illustrated in FIGURES 2–5, or can be formed as a casting, as illustrated in FIGURES 7 and 8, or, conceivably, could be molded of plastic. In any event, the shoe has opposite legs 27 extending downwardly from its bight portion 28 to define a slit 29 which extends through the shoe from end to end thereof and opens to its bottom.

Figures 2, 6:
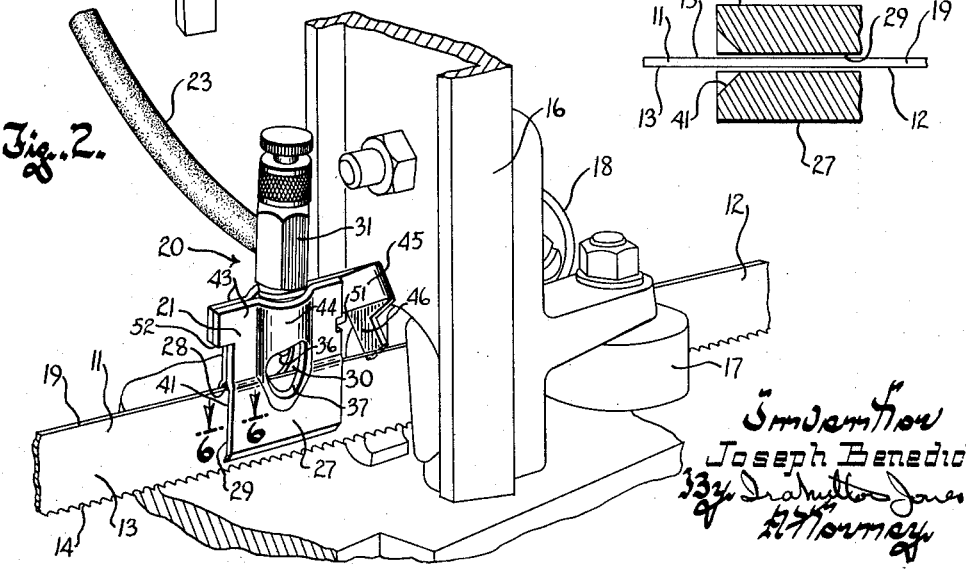
FIGURE 2 is a detail perspective view on an enlarged scale showing the liquid lubricant applicator of this invention installed on a band cutoff machine which differs in certain respects from that shown in FIGURE 1.
FIGURE 6 (Sheet 1) is a sectional view on an enlarged scale taken on the plane of the line 6—6 in FIGURE 2.

The width of the slit 29 is such that a saw band can be substantially closely but freely slidably received between the legs 27, and its depth is such that when the bight portion of the shoe rests upon the back edge 19 of the band, the bottom edges of the legs 27 are spaced very slightly above the gullets of the teeth in the band, as best seen in FIGURES 2 and 3.

Opening downwardly in the bight portion of the shoe, intermediate its ends, is a bore or well 30, in the upper portion of which is fixed a more or less conventional tubular needle valve body 31 that has a downwardly opening coaxial bore 32 and an upwardly opening counterbore 33. A laterally extending nipple 34 on the needle valve body, communicating with the counterbore 33 therein, provides for connection of the flexible duct 23 with the needle valve body so that oil from the container can flow downwardly through the needle valve body, into the lower portion of the bore or well 30 in the shoe, and thence into the space between the legs 27. A needle valve element 39, threadedly received in the counterbore 33 in the needle valve body, closes the upper end of the counterbore and cooperates with the seat defined by the junction of said counterbore with the bore 32 to provide for regulation of the rate at which oil flows downwardly out of the needle valve body.

The bore or well 30 in the shoe opens downwardly into grooves 35 in the inner faces of the legs, which grooves together in effect form a continuation of the bore 30, but taper inwardly at their lower ends so as to merge into the inner flat surfaces of the legs. The grooves 35 thus serve to guidingly conduct oil to the side surfaces of a saw band received between the legs.

To prevent blocking of the mouth of the bore 32 by a drop of oil adhering thereto because of surface tension, a rod-like element or pin 36 extends downwardly from the mouth of the bore 32. This rod-like element may be a cotter pin with its legs frictionally gripping the sides of the bore and its head lowermost so that the oil passing through the needle valve runs down the cotter pin and drips, drop-by-drop off the head of the pin and onto the back edge of the saw band.

Aligned apertures or holes 37 in the legs 27 of the shoe provide a window through which the lower end portion of the rod-like element 36 can be seen. Thus the rate at which oil drips onto the band can be determined by observation. Thus by observing and counting the drops of oil per unit of time as the needle valve 39 is adjusted, the rate at which the oil is fed to the saw band may be easily regulated to provide just the right amount, which should be neither so great as to cause dripping of oil off the band nor so small that the band is inadequately lubricated.

The grooves 35 are located a substantial distance from the downstream end of the shoe so that a substantial portion of the shoe is available to spread the oil over the side faces of the band.

Oil which is on the band as it reenters the shoe is redistributed over the side surfaces and back edge of the band, by inwardly converging edges 41 at the upstream end of the shoe. Attention is directed to the fact that the bevel which forms the converging edges 41, also tapers inwardly and downwardly at its lower end, as at 42 (see FIGURE 5) to cause oil to flow by gravity to the gullets of the teeth on the band, assuring that the teeth will receive adequate lubrication.

In the embodiment of the invention illustrated in FIGURES 2–5, the shoe or distributor comprises a pair of complementary stampings 43, each of which provides one side of the bight portion 28 of the body and one of its legs 27, the leg portion being, of course, defined by an outwardly offset lower portion of the stamping. The well or bore 30 is formed by a semicircular bay 44 in the bight portion of each shoe stamping that extends downwardly into the leg portion of the stamping to define the groove 35. The aperture 37 is punched through the bay 44 in each stamping, with its center substantially at the offset between the leg and bight portions of the stamping. The two shoe stampings are secured together, as by spot welds, with their bight portions flatwise contiguous.

The two stampings that comprise the shoe can be mirror images of one another except that one of them includes an integral arm or tang 45 that projects forwardly in the direction of saw band motion and is bent over at its front end to provide a substantially forwardly facing shoulder or abutment 46 which is engagable with a fixed part on a saw guide of a band cutoff machine.

It will now be apparent that the applicator shoe or distributor is adapted to straddle the cutting stretch of a saw band and ride thereon, being thus held on the band by its own weight with its bight portion resting on the back edge 19 of the saw band and its legs 27 wiping the side surfaces 13 of the band to distribute oil evenly over them. The shoe is restrained against forward motion with the band by the engagement of its abutment 46 against a band guide support or some other relatively fixed part of the machine adjacent to the cutting zone. Hence the tang or arm 45 should be rigid enough to hold the shoe against forward displacement with the band, but should nevertheless be capable of easy bending so that it can be readily adjusted to accommodate any cutoff saw.

In the case of the machine illustrated in FIGURE 2, for example, the arm 45 has been given a partial downward twist to enable its abutment portion 46 to firmly engage against the web portion of a channel shaped band guide arm 16. It is to be observed that the shoe in no wise interferes with adjustment of the saw guide support or arm against which it engages, because of the fact that the shoe can be readily moved lengthwise in either direction along the cutting stretch of the band.

In the installation illustrated in FIGURE 3, the machine is provided with a bracket 48 which is normally used to support a brush that engages the saw band to remove chips therefrom as the band enters the cutting zone. This bracket comprises a substantially rectangular loop 49 of a size to loosely embrace the shoe and a pair of apertured mounting lugs 50 projecting from one end of the loop and by which the bracket is secured to the roller journal studs 48 on the adjacent band guide support. In this instance the brush is removed from the bracket 48 and the bracket is used to hold the applicator of this invention more or less captive. A notch 51 in the downstream or front end of the shoe engages over the adjacent inner marginal edge portion of the loop 49 of the bracket and cooperates with a shoulder 52 on the upstream end of the shoe, resting upon the adjacent end of the bracket, to hold the shoe in place embracing the saw band. Usually two such brackets are supplied with the machine, one attached to each guide arm. The brush need only be removed from the bracket attached to the upstream guide arm and replaced by the applicator shoe of this invention; the brush held by the bracket on the downstream guide arm can remain in place.

In the embodiment of the invention illustrated in FIGURES 6 and 7 the shoe is formed as a unitary casting, and the tang or arm 45 that carries the abutment 46 comprises a separate stamping 53 or the like which is secured along one side of the shoe by means of screws 54 threaded into the shoe casting.

From the foregoing description taken together with the accompanying drawings, it will be apparent that this invention provides an automatic applicator by which lubricating oil can be constantly brought to and spread over a saw band of a cutoff machine, which applicator is capable of being installed on virtually any such machine without requiring alteration or modification thereof and provides for accurate adjustment and control of the rate of oil flow to the saw band to insure that lubricant is applied to the band at substantially the rate that it is used.

What is claimed as my invention is:

1. An applicator for applying liquid lubricant to an endless saw band in a band machine of the type wherein a straight substantially horizontal cutting stretch of the band is held by a pair of spaced apart guide means with its side surfaces substantially upright and its teeth lowermost, said applicator comprising: an elongated shoe having an inverted U-shaped cross section, with a lengthwise extending bight portion defining an elongated downwardly facing surface and a pair of opposite legs projecting downwardly from the bight portion and having opposing elongated upright surfaces spaced apart by a distance substantially equal to the thickness of a saw band, said shoe being adapted to slidingly straddle a saw band in the cutting stretch thereof with its said bight portion seated directly on the upper edge of the band and its legs closely but slidably contacting the side surfaces of the band along substantially all of its width between its upper edge and the gullets of its teeth; means on the shoe providing an abutment which faces in a direction substantially lengthwise of the shoe and which is engageable with a relatively fixed part on a band saw machine adjacent to one of its band guide means to restrain the shoe against moving forwardly along the saw band which the shoe straddles; means in the shoe defining a passage that opens downwardly through its bight portion and through which liquid lubricant can be introduced into the space between the legs to be spread over the side surfaces of a saw band between the legs by said opposing surfaces on the legs as the saw band moves relatively to the shoe; and means for communicating said passage means with a source of liquid lubricant.

2. The applicator of claim 1, further characterized by adjustable needle valve means in said passage defining means by which the rate of flow of liquid lubricant into the space between the legs can be regulated.

3. The applicator of claim 2, further characterized by a rod like element extending downwardly in said passage defining means to a level just above said downwardly facing surfaces, and along which liquid lubricant is adapted to flow by surface conduction and to be guided to the upper edge of a saw band between the legs; and further characterized by an aperture in the shoe, laterally in line with said rod like element, through which the flow of liquid lubricant along said element can be observed, to facilitate adjustment of the needle valve means.

References Cited in the file of this patent
UNITED STATES PATENTS

| | | |
|---|---|---|
| 121,373 | Ide | Nov. 28, 1871 |
| 839,787 | Shobert | Dec. 25, 1906 |
| 1,338,157 | Rains | Apr. 27, 1920 |
| 2,515,345 | Hayes | July 18, 1950 |
| 2,543,638 | Mercier | Feb. 27, 1951 |